United States Patent [19]

Yamamoto et al.

[11] 4,390,261

[45] Jun. 28, 1983

[54] FLASH CAMERA WITH PHOTOGRAPHIC MODE SELECTOR

[75] Inventors: Hiroshi Yamamoto; Masanori Uchidoi, both of Yokohama, Japan

[73] Assignee: Canon Kabushiki Kaisha, Tokyo, Japan

[21] Appl. No.: 300,597

[22] Filed: Sep. 9, 1981

[30] Foreign Application Priority Data

Sep. 10, 1980 [JP] Japan .................................. 55-125491

[51] Int. Cl.³ .............................................. G03B 1/12
[52] U.S. Cl. .................................................. 354/173
[58] Field of Search ........................ 354/149, 139, 173

[56] References Cited

U.S. PATENT DOCUMENTS 4,196,992 4/1980 Shono ................................. 354/173

Primary Examiner—Michael L. Gellner
Attorney, Agent, or Firm—Toren, McGeady and Stanger

[57] ABSTRACT

In the disclosed camera, which is operable with a rechargeable electronic flash and an automatic winding mechanism, a photographic mode selector is arranged to switch from a continuous photographic mode in which successive photographs are taken as long as the shutter button is depressed to a single photographic mode in which a single photograph is taken every time the shutter button is depressed, in response to the rechargeable electronic flash being set to an operative condition.

7 Claims, 5 Drawing Figures

4,390,261

FLASH CAMERA WITH PHOTOGRAPHIC MODE SELECTOR

BACKGROUND OF THE INVENTION

1. Field of the Invention

This invention relates to cameras, and particularly to a photographic mode selector for a camera operable with a rechargeable flash device and an automatic film winding device (or film winder).

2. Description of the Prior Art

Generally, a single lens reflex camera with a winder scan operate in two photographic modes, namely, the continuous photographic mode and the single photographic mode. In the continuous photographic mode, an object is photographed and the exposed film frame wound repeatedly and continuously as long as the shutter button is depressed and until the shutter button is freed, at which point the photographic operation and the film winding operation are both stopped. In the single photographic mode, one picture is taken when the shutter is released and the exposed film frame is wound when the shutter button is freed. Both of these modes can be performed without problems when used in daylight photography. However, in flash photography, using an electronic flash device, the latter cannot charge completely at a speed at which the winder advances the film. This results in improper exposures.

As a result, when using a flash with a conventional single lens reflex camera having a winder, the photographer must always check the photographic mode of the camera. This is quite troublesome. Furthermore, there is a danger of wasting a great quantity of film when mistakenly using the flash in the continuous photographic mode because of a failure to check the photographic mode.

SUMMARY OF THE INVENTION

It is, accordingly, an object of the present invention to provide an improved camera provided with photographic mode change over means for a rechargeable electronic flash photographing, which obviates the disadvantages of prior art devices.

It is another object of the present invention to provide a camera operable with a photographic mode change over means for a rechargeable electronic flash photographing and a winder device in which the photographic mode is always the single photographic one when the rechargeable electronic flash device is used so the above-mentioned shortcomings are eliminated and thereby improve the operability.

These and further objects and features of the invention will become apparent from the following detailed description of embodiments thereof taken in connection with the accompanying drawings.

DESCRIPTION OF THE PREFERRED EMBODIMENT

Below, the present invention will be explained in detail in accordance with the accompanying drawings of a single lens reflex camera in which the winder device and the rechargeable electronic flash device are incorporated.

Figure 1:
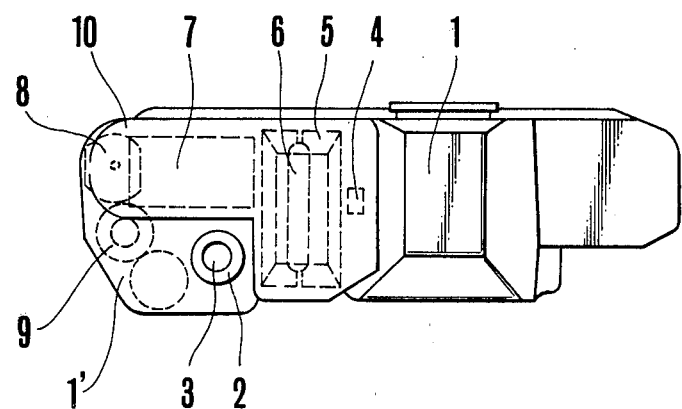
FIG. 1 shows an embodiment of a camera to which the present invention is applied, seen from the above.
Figure 2:
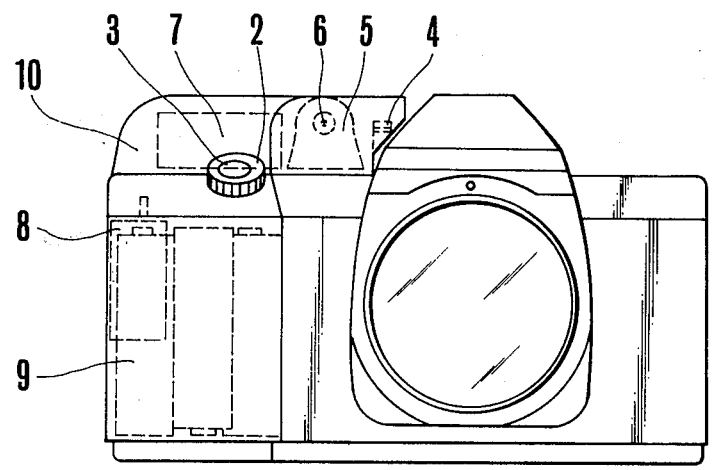
FIG. 2 shows the camera of the present invention in FIG. 1, seen from the front.
Figure 3:
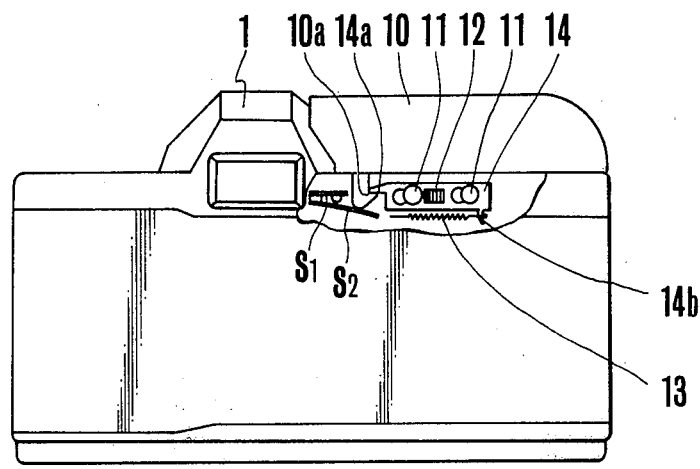
FIG. 3 shows the camera of the present invention in FIG. 1, seen from the back.
Figure 4:
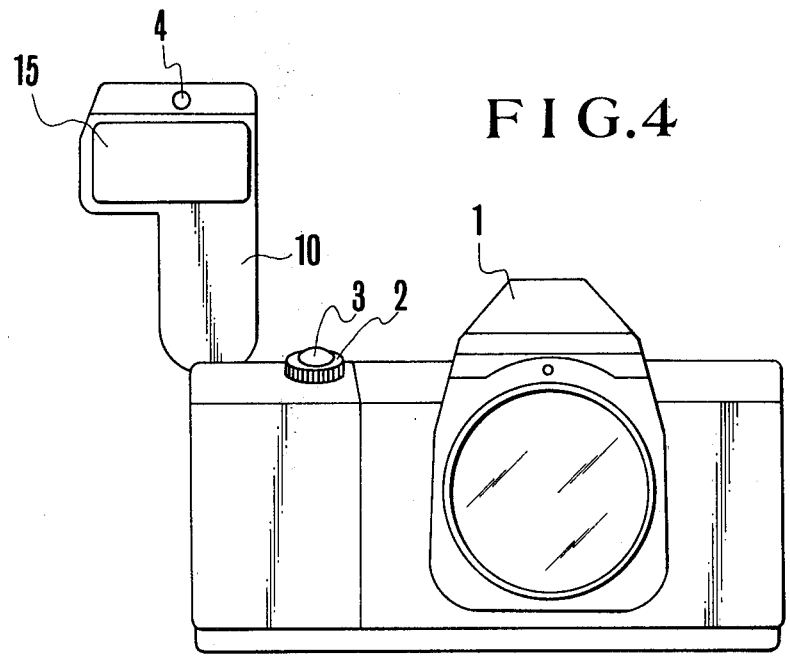
FIG. 4 shows the present invention at the time of the flash light photography, seen from the front.

FIGS. 1 to 4 illustrate a single lens reflex camera incorporating a winder (or winder device) and a rechargeable electronic flash unit or device. FIG. 1 shows a plan view showing the condition in which the rechargeable electronic flash device is folded in. FIG. 2 illustrates the same conditions in the camera as viewed from the front, FIG. 3 shows this condition of the camera seen from the back, with a partially broken away section, and FIG. 4 shows the camera with the rechargeable electronic flash unit pulled out, as viewed from the front.

In these drawings, a camera body 1 has a flash emitting case 10 connected thereto by means of a joint mechanism (not shown). The case 10 contains a reflector 5, a discharge tube 6, and a main capacitor 7 for the electronic flash. Element 4 is a computing light sensing element. Further, at a projection 1' in front of the case 10 is a shutter release button 3 and mounted around the projection 1' is the shutter time adjusting dial 2 contained in the projection 1' provided on the camera body 1, are the motor 8 for winding up the film and charging the photographing mechanism and small batteries for driving the motor 8. This joint mechanism is explained in detail in Japanese patent application No. Sho 55-66952, so that its explanation is omitted here.

In FIG. 3, a flash mode change over member 12 is secured on the slide plate guided with the pin 11 so as to slide. At the one end of a slide plate 14 is a hanger 14b for the spring 13 which urges the slide plate 14 to the left in the drawing. At the other end a claw 14a engages with the hook 10a of the case 10 when the slide plate 14 has been brought in the position shown in the drawing by means of the spring is provided. A change over switch 16 has contacts S1 and S2 which are brought in contact when the hook 10a of the case 10 is disengaged from the claw 14a of the slide plate 14, so as to pop up the case 10. Further, 15 is the protector for the discharge tube 6.

Figure 5:
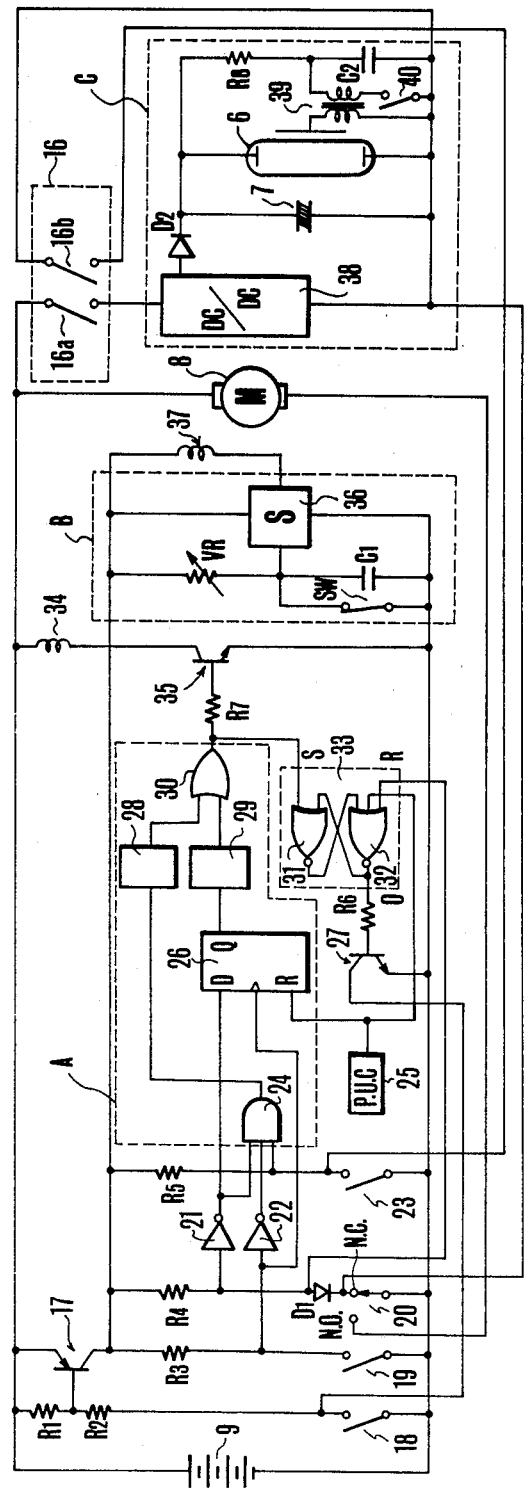
FIG. 5 shows the circuit of the present invention.

FIG. 5 shows the circuit of the present invention. Here, a switch 18 is arranged to be closed at the first step of a stroke of the shutter button, and a release switch 19 to be closed with the second step of a stroke of the shutter button. A winding control switch is to be switched over the N.O. side in the drawing with the finish of the release and the N.C. side with the finish of the film winding up. The level of whose output of inverters 21 and 22 are made high by means of the transistor 17 when the switches 18 and 19 are closed. The output of the inverter 21 is delivered to the AND gate 24 and D terminal of the D type Flip-Flop 26 (hereinafter called D-FF), while the output of the inverter 22 is delivered to the AND gate 24. A photographic mode setting switch 23 serves for setting the continuous photographing mode or the single photographing mode in case of day light photographing, the circuit being constructed so that the mode is continuous when the switch 23 is opened, while it is for single exposures when the switch 23 is closed.

A power up clear circuit 25 (hereinafter called P.U.C.) serves for producing a pulse when the switch 18 is closed. Its output terminal is connected to a D flip flop 26 and the reset terminal of the SR type Flip-Flop composed of the NOR gates 31 and 32 respectively. A transistor 27 is brought into the switched-on state by means of the output of the SR-FF33 when the SR-FF33 is set. The circuit A is for judging whether the mode is single frame or continuous photography, includes an AND gate 24, the D-FF26, a one shot circuit 28 for producing pulses for a predetermined time by means of the output of the AND gate 24, a one shot circuit 29 for producing pulses for a predetermined time by means of the output of the D-FF26 and an OR gate 30 connected to the above one shot circuits 28 and 29. The output of the OR gate 30 is delivered to the set terminal of the SR-FF33 and at the same time controls the conductive state to the release magnet 34 through the transistor 35. A shutter time control circuit B is composed of a count start switch SW to be opened with the running start of the leading shutter curtain not shown in the drawing by means of the current supply to the release magnet 34, a resistor VR and the condenser or capacitor C1 for setting the exposure time and a Schmidt circuit 36. The latter is inverted after a lapse of time set with the resistor VR and the condenser C1 so as to interrupt the current supply to the exposure time control magnet 37 in order to let the tail or trailing shutter curtain, not shown in the drawing, start to run. Switches 16a and 16b form the changeover switch 16, with the switch 16a for starting the charge of the rechargeable electronic device, and the switch 16b for setting the single photographic mode. A circuit C of the rechargeable electronic flash device includes a voltage step up circuit 38 for supplying current to the main condensor or capacitor 7 when the switch 16a is closed and the discharge tube 6. Further, a trigger circuit 39 triggers the discharge tube 6 in response to the switch 40 which is closed when the leading shutter curtain has run.

Below, the operation of the device constructed as above in accordance with the present invention will be explained in accordance with FIG. 5.

Firstly, when the mode is set for continuous operation during daylight photography, the photographic mode set switch 23 is in the opened state. When the shutter button is depressed in this state so as to close the switch 18, the whole circuit is brought in the conductive state by means of the transistor 17, whereby a high level pulse signal is produced with the P.U.C.25 so as to reset the D-FF26 and the SR-FF33. Because at this time the winding control switch 20 is at the N.C. side the level of the output of the inverter 21 becomes high. When the shutter button 3 is further depressed the switch 19 is also closed, the level of the output of the inverter 22 also becomes high. Because at this time the switch 23 is in the opened state, the level of the three inputs of the AND gate 24 is all high, so that the level of the output of the AND gate 24 becomes high so as to actuate the one shot circuit 28. The one shot circuit 28 actuated with the output of the AND gate 24 produces pulses for a predetermined time, which pulses are delivered to the transistor 35 through the OR gate 30. Thus, the transistor 35 is brought in the switched on state, by which a current is supplied to the release magnet 34 so as to let the leading shutter curtain not shown in the drawing start to run. Further, because the output of the OR gate 30 is connected to the set input terminal of the SR-FF33, when the level of the output of the OR gate 30 becomes high the SR-FF33 is set so as to keep the transistor on. Hence, the current continues to be supplied to the whole circuit. When the current is supplied to the release magnet 34 so as to let the leading shutter curtain not shown in the drawing start to run, the count start switch is opened. Thus, the Schmidt circuit 36 is inverted after the lapse of the time determined by the resistor VR and the condenser C1 and the current supply to the exposure time control magnet 37 is interrupted so as to let the tail shutter curtain not shown in the drawing start to run. When the tail shutter curtain has run the switch 20 is changed over from the N.C. side to the N.O. side, the motor 8 is driven so as to carry out the film winding and the charging or cocking of the photographing mechanism. The inversion of the output of the inverter 21 inverts, the high level of the output of the AND gate 24 to low again. Because at this time the SR-FF33 is reset so as to release the power supply, the current supply to the whole circuit is interrupted and the camera stops its photographic operation if the shutter button is freed so as to open the switch 18. However, if the shutter button 3 is in the released state even when the tail shutter curtain has run and the switch 20 is changed over from the N.C. side to the N.O. side, the switches 18 and 19 are in the closed state so that the current continues to be supplied to the whole circuit. Thus, because the level of the output of the AND gate 24 becomes high when the motor 8 has wound up the film and the switch 20 is connected to the N.C. side, the above-mentioned camera operation is repeated, whereby the pictures are taken continuously.

Secondly, the case of the mode is single frame photography during daylight photography follows. Here, the photographing mode set switch 23 is in the closed state. When the shutter button 3 is depressed and the switch 18 is closed in this state, the current is supplied to the whole circuit through the transistor 17. Hence, the P.U.C.25 delivers a high level pulse signal so as to reset the D-FF26 and the SR-FF33, while the level of the D input of the D-FF26 becomes high by means of the inverter 21 because the switch 20 has been changed over to the N.C. side. When the release button 3 is further depressed the switch 19 is also closed, whereby the high level of the clock input of the D-FF26 is inverted into the low level. With the rising edge of this clock input, the D input of the D-FF26 is latched, so that the level of its output Q is inverted to a high. Thus, the one shot circuit 29 delivers predetermined pulses to be delivered to the transistor 35 through the OR gate 30. Hence, after the same operation as in case of the continuous photographing mode the shutter has run and the film has been wound up. When the film has been wound up and the switch 20 has been again changed from the N.O. side to the N.C. side the level of the output of the AND gate 24 is low in case of the single photographing mode because the switch 23 is in the closed state. The level of the Q output of the D-FF26 remains high when the switch 19 is closed, namely the shutter button 3 is in the released state, so that no pulse signal is delivered to the one shot circuits 28 and 29. Thus, when the shutter button 3 is released and the picture taking and the film winding up are finished, the camera operation for the single photographing mode stops. Further, when the depressed shutter button 3 is freed, the switches 18 and 19 are opened so as to interrupt the current supply to the whole circuit. Hence, a new picture can be taken.

The operation at the time of switching from daylight photography to the flash photography is as follows. When in FIG. 3 the flash mode change over means 12 is manually operated so as to displace the slide plate 14 guided with the pin 11 to the left in the drawing, the claw 14a of the slide plate 14 is disengaged from the hook 10a of the case 10. Thus, the case 10 is popped up by means of the joint mechanism not shown in the drawing, so that flash photography is possible as is shown in FIG. 4. With the popping up of the rechargeable electronic flash case 10 the change over switch 16 is closed. Hence, the switch 16a for supplying current to the electronic flash circuit C shown in FIG. 5 and the switch 16b connected in parallel with the switch 23 for selecting the continuous photographic mode or the single photographic mode are closed. Thus, when the shutter button 3 is depressed in this state, the level of the output of the AND gate 24 remains low whether or not the photographic mode setting switch 23 is closed or opened. Consequently, when the level of the output Q of the D-FF26 becomes high in the same way as in case of the single photographing mode with the closing of the switches 18 and 19, the one shot circuit 26 is actuated and the transistor 35 is switched on with the pulse signal produced from the one shot circuit 29 in such a manner that the release magnet 34 becomes conductive and the leading shutter curtain starts to run. When the leading shutter curtain has run the switch 40 is closed and the trigger circuit 34 is actuated so as to trigger the electronic flash discharge tube 6. Further, the tail shutter curtain is allowed to start to run by the shutter exposure time control circuit B after the lapse of a predetermined time after the start of the leading shutter curtain. When the tail shutter curtain has run the switch 20 is changed over from the N.C. side to the N.O. side.

The motor 8 is now driven so as to start the film winding and the charge of the photographing mechanism, during which time the current supply to the electronic flash circuit C is interrupted so as to avoid the waste of the power. When the film has been wound up the switch 20 is again changed from the N.O. side to the N.C. side so as to start the current supply to the electronic flash circuit C. Because at this time the switch 16b remains closed, even if the shutter remains released by the depressed shutter button the level of the three inputs of the AND gate 24 does not become high but remains low and the level of the Q output of the D-FF26 remains high, so that the one shot circuits 28 and 29 do not operate. Because thus the transistor 35 cannot be switched on through the OR gate 30, even if the shutter remains in the released state with the shutter button 3 the camera operation stops at the time point at which the film has been wound up. Further, if in this case the depressed shutter button 3 is freed the switches 18 and 19 assume the opened state so that it becomes again possible to take photograph. Thus, it is necessary to wait until the rechargeable electronic flash circuit C has been charged.

The embodiment of the present invention relates to a camera incorporating a winder winding film and a rechargeable electronic flash device and arranged so that when the rechargeable electronic flash device pops up the photographic mode of the camera is changed over into the single photographing mode. However, the present invention is not limited to such devices, but also includes the devices for changing the photographic mode for example, by mounting a separately constructed rechargeable electronic flash device on the camera in which the winder device is incorporated or can be incorporated.

As explained above in detail in accordance with the present invention the camera in which the exposed film is automatically wound up by the winder device contains a first manually operated change over means for setting the continuous photographic mode or the single photographic mode and a second change over means connected in parallel to the first change over means so as to switch the photographic mode. The second change over is changed over to the single photographic mode when the power source is connected to the rechargeable electronic flash device. Consequently, during flash photography, with the rechargeable electronic flash device, this avoids carrying out the flash photography in the continuous photographing mode. It prevents the shutter from running even before the charge completion of the rechargeable electronic flash device in such a manner that the flash photographing is carried out with improper exposure. Further, in accordance with the present invention, it is sufficient to provide the second change over means to be switched at the time of the flash photographic in parallel to the first change over means in order to set the camera in the single photographic mode at the time of the flash photographing. Hence, the device itself can be constructed very simple.

Also, in accordance with the present invention, it is possible to prevent the power source from being over loaded by providing a change over switch which interrupts the current supply to the rechargeable electronic flash device in order to lower the load on the power source while the current is supplied to the motor.

What is claimed is:

1. A camera operable with an automatic film winder and a rechargeable electronic flash means settable into an operable condition, comprising:
    a shutter button;
    photographic mode change over means for changing from a continuous photographic mode in which successive photography is maintained as long as the shutter button is depressed to a single photographic mode in which ordinary single photography is achieved every time the shutter button is depressed, and for changing over to said single photographic mode in response to the flash means being set in the operable condition,
    said change over means comprising first means manually operable for changing over to said both modes respectively and second means arranged in parallel with the first means, said second means being arranged for changing to said single photographic mode irrespective of the changing over of the first means for setting said camera to the single photographic mode when said rechargeable electronic flash means are set in the operable condition.

2. A camera according to claim 1, wherein said camera includes a body and said electronic flash means are mounted on said body and movable relative to the body from an inoperative position to an operative position and wherein said photographic mode change over means are arranged to change over to said single photographic mode when the flash means is moved into the operative position.

3. A camera provided with photographic mode change over means for rechargeable electronic flash photography according to claim 1, wherein switching means control the connection of said electronic flash means to an electric power source, said switching means being connected in series with said power source and arranged to be closed to charge the flash means when said flash means is set in the operative condition, and when said automatic winding means are not operated.

4. A camera according to claim 4, wherein said switching means comprises a first switch normally opened and a second switch normally closed, said first switch being always closed when said flash means is positioned in the operative condition, said second switch being arranged always to interrupt the power supply to said flash means when said winding means are supplied with the power source.

5. A camera according to claim 5, wherein said second switch is a selector switch to connect the power source to said winding means and to said flash means respectively.

6. A camera operable with a power source, a rechargeable electronic flash and an automatic film winder for winding exposed film, comprising:
a shutter button;
manually operated first change over means for setting the photographic mode of the camera in the continuous photographic mode in which continuous photography is carried out as long as the shutter button is depressed and in a single photographic mode in which a single exposure is taken every time the shutter button is depressed, and
second charge over means for changing the photographic mode of the camera to the single photographic mode when a power source is connected to the rechargeable electronic flash means.

7. A camera in accordance with claim 6, wherein the rechargeable electronic flash is incorporated in the camera, means for holding the flash quiescent in the camera and popping the flash up for use, means for starting a current supply to the flash means when said flash means is popped up and for switching the second change over means to change the mode of the camera to the single photographic mode.

* * * * *